July 31, 1923.
W. B. FAGEOL
POWER TRANSMISSION GEAR MECHANISM
Filed Dec. 15, 1920
1,463,389
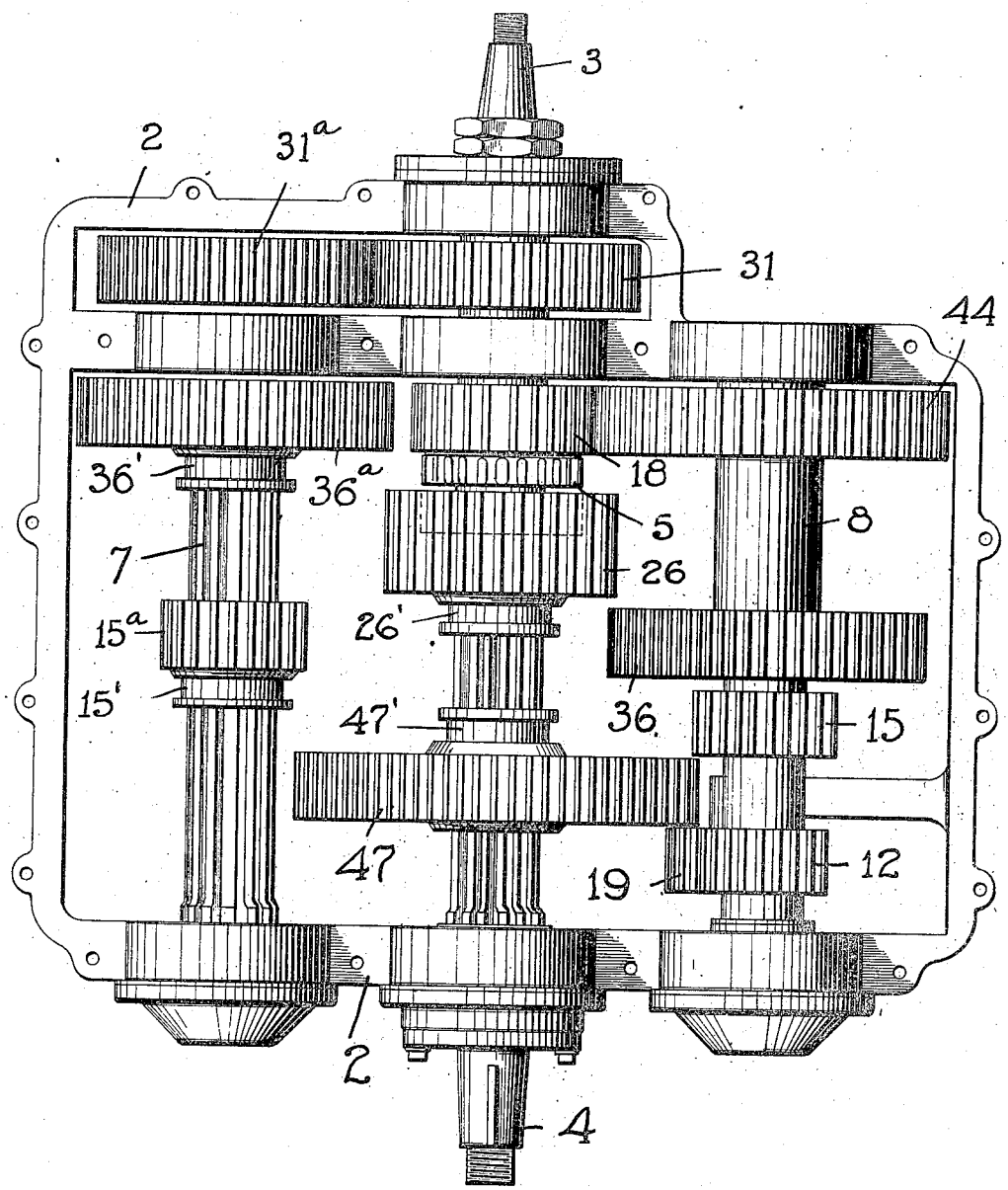
WITNESS
INVENTOR
William B. Fageol.
BY
his ATTORNEYS Patented July 31, 1923.

1,463,389

UNITED STATES PATENT OFFICE.

WILLIAM B. FAGEOL, OF OAKLAND, CALIFORNIA.

POWER-TRANSMISSION-GEAR MECHANISM.

Application filed December 15, 1920. Serial No. 430,868.

*To all whom it may concern:*

Be it known that I, WILLIAM B. FAGEOL, a citizen of the United States, and a resident of Oakland, county of Alameda, and State of California, have invented certain new and useful Power-Transmission-Gear Mechanism, of which the following is a specification.

The invention relates to gear mechanism of the types involving a main driving shaft and a driven-shaft adapted to be connected directly for high speed rotation and also adapted to be driven at various relative speeds thru the intermeshing of selective gears.

It is one of the objects of the present invention to provide an extremely simple, practicable, substantial and easily operable gear mechanism.

A further object of the invention is to provide such a mechanism in which all of the parts are in themselves very simple and which, when combined, provide a variable gear mechanism, certain of the gears of which are shiftable with respect to other fixed gears and certain of the shiftable gears being adapted to interengage with one another.

Another object of the invention is to provide a construction of this type in which there is but a single clutch device operative to directly and positively connect relative elements.

An important object of the invention is to provide a gear mechanism whereby a considerable number of variations of speed can be secured in the forward drive or the rotation of the driven shaft in one direction when giving a single reverse speed drive; it being in this connection, an object of the invention to provide especially for an overspeed drive to secure a driving, for instance, of the propeller shaft of a motor driven vehicle at a speed greater than that of the rotation of the crank shaft of the power plant, this being especially desirable where the vehicle is being propelled over roadways that are substantially level, and a very low or emergency speed for pulling on steep grades or bad roads.

The invention possesses other objects and features of advantage, some of which, with the foregoing, will be made manifest in the following description of the preferred form of the invention which is illustrated in the drawing accompanying and forming part of the specification. It is to be understood that it is not intended to limit the invention to the embodiment shown by the said drawing and description as variations may be adopted within the scope of the invention as set forth in the claims.

The figure is a plan of the improved mechanism all of the gears being in the neutral position.

The present invention consists essentially of coaxial main driving and driven shafts with a suitable clutch for directly connecting the same for ordinary high speed drive purposes and involves also a plurality of parallel counter shafts which provide, not only for the driving of the driven shaft at various speeds from the main shaft, but also provide for the reverse of the driven shaft and more particularly provide for the driving of the driven shaft at an overspeed rate. By overspeed is meant that the driven shaft may be driven at a rate of rotation higher than that of the driving shaft. A feature of the invention is the construction, combination and organization of the elements of the gear so as to eliminate complex mechanism and reduce it to the ultimate simplicity of but one clutch in the whole.

The mechanism is designed to be mounted in any suitable bearing and housing structure that may serve as an oil retainer only one section 2 of the housing being here shown. From one end of the housing there projects a main or driving shaft 3 co-axially arranged with the driven shaft 4; the inner end of the drive shaft being provided with a positive clutch member 5 adapted to be meshed in driving engagement with a socket clutch member 6 on the contiguous end of the shaft 4.

Here shown as on diametrically opposite sides of the main and driving shafts 3 and 4 is a pair of counter shafts 7 and 8 whose ends are suitably journalled in the housing 2.

As above expressed it is desirable to drive the driven shaft 4 at various speeds with respect to the speed of rotation of the main shaft 3 and this is secured in the present case by the provision of sets of spur gears on the several shafts. For the purpose of illustration as well as demonstration the several gears will be referred to by reference numerals which equal the number of teeth in the gears.

It is obvious that the ratio of the gears used thruout the mechanism may be readily determined according to the requirement and therefore the illustrated ratio is only for purpose of one example of construction.

On the main shaft 3 is secured fixedly a gear 31 (the numeral indicating that it has 31 teeth) and this meshes with a complementary gear 31ª also having 31 teeth so that the countershaft 7 is driven at the same rate of speed as the main shaft 3. On the inner end of the main shaft 3 is a gear 18 fixed to the shaft and driving a gear 44 fixed to a second parallel counter-shaft 8. The reverse drive of the driven shaft 4 is secured by shifting a gear 47 which is splined on the shaft 4 into mesh with the reverse pinion 19, which is in mesh with the pinion 12 on the counter-shaft 8. The gear 47 is provided at one side with a grooved collar 47' to be engaged by any suitable shift lever by which the gear may be manipulated.

A very low speed or emergency drive of the driven shaft 4 is secured by shifting the gear 47 along its shaft 4 so as to bring it into mesh with a pinion 15 secured fixedly upon the counter-shaft 8 and from this it will be seen that the gear 47 has the dual function of serving in one position as the reverse when engaging the reverse pinion 19 and when in the position engaging the pinion 15 on the shaft 8 drives the driven shaft at a low rate of speed.

An intermediate rate of drive for the shaft 4 is secured thru means of a gear 36 fixed on the shaft 8 and which is adapted to mesh with an intermediate gear 26 that is splined on the driven shaft 4 and is provided with a shift collar 26'. The gear 26 is shown as formed to coact by socket 6, with the direct drive clutch member 5 so that the latter is engaged thru means of the shift ring or collar 26'.

For the purpose of securing an overspeed drive as between the shafts 3 and 4 there is splined on the counter-shaft 7 a gear 36ª having a grooved collar or hub portion 36' to engage a shifting lever. The gear 36ª is designed to be shifted into mesh with the gear 26 which is splined on the inner end of the driven shaft 4 and since the gear 26 is smaller than the gear 36ª and since the shaft 7 is driven at the same rate of speed as the main shaft 3 it will be seen that the driven shaft 4 will rotate at a higher rate of speed than the shaft 3. A further advantage is taken of the shaft 7 to drive the driven shaft 4 by providing on the shaft 7 a splined gear 15ª having a grooved hub or collar 15' to be engaged with a shift lever; this gear 15ª being shiftable into mesh with the low speed and the reverse gear 47 when it occupies a neutral position between the pinions 12 and 15 on the shaft 8. The drive through pinion 15ª and gear 47 provides the normal low speed drive ratio.

From the above it will be seen that the mechanism includes a plurality of countershafts which are constantly driven from the main shaft 3 without the interposition of any clutch, the only clutch utilized being that for directly connecting the main shaft 3 and the driven shaft 4 for direct drive. All of the gears on the counter-shaft 8 are fixed while the gears on the shafts 4 and 7 are designed to be shifted on their respective shafts with the exception of gears 44, and the gear 31ª this meshing with the main driving gear 31 on the shaft 3.

With the above ratio of gears there is secured five forward selective and progressive speeds as follows:

1st, 7.65 to 1; 2nd, 3.13 to 1; 3rd, 1.76 to 1; 4th, 1 to 1; 5th, .722 to 1, and a reverse 9.58 to 1.

In the construction shown in the drawings, the shafts 3 and 7 are driven at the same speed, but it is to be understood that this is only one form of the invention, since the relative sizes of the gears 31 and 31ª may be so chosen as to give any desirable speed relation of the two shafts and this is likewise true of shafts 3 and 8.

What is claimed is:

A transmission gearing comprising a driving and a driven shaft, clutch means for connecting said shafts for direct drive, a pair of countershafts, fixed gears on said countershafts and on said driving shaft for turning the countershafts at different speeds, a pair of forward drive gears fixed on the slower moving countershaft, a pair of gears slidable on said driven shaft and respectively engageable with said forward driving gears, a jack shaft, a reversing gear fixed on said jack shaft and adapted to be engaged by one of said driven shaft gears, a gear on said slower moving countershaft and in mesh with said reverse gear and a pair of gears slidable on the faster moving countershaft and respectively engageable with said driven shaft gears.

In testimony whereof, I have hereunto set my hand.

WILLIAM B. FAGEOL.